(12) United States Patent
Kensrue

(10) Patent No.: US 7,241,972 B2
(45) Date of Patent: Jul. 10, 2007

(54) MINIATURE WELDING GUN

(75) Inventor: Milo M. Kensrue, Carlsbad, CA (US)

(73) Assignee: M.K. Products, Inc., Irvine, CA (US)

( * ) Notice: Subject to any disclaimer, the term of this patent is extended or adjusted under 35 U.S.C. 154(b) by 78 days.

(21) Appl. No.: 10/818,955

(22) Filed: Apr. 6, 2004

(65) Prior Publication Data

US 2005/0218130 A1    Oct. 6, 2005

Related U.S. Application Data

(60) Provisional application No. 60/560,025, filed on Apr. 5, 2004.

(51) Int. Cl.
    *B23K 9/12* (2006.01)
(52) U.S. Cl. .................. 219/137.2; 219/137.7
(58) Field of Classification Search ............. 219/137.2, 219/137.7, 136
    See application file for complete search history.

(56) References Cited

U.S. PATENT DOCUMENTS

| | | | |
|---|---|---|---|
| 2,808,498 A | 10/1957 | Hudson et al. | |
| 3,210,522 A * | 10/1965 | Adamson et al. | ......... 219/137.7 |
| 3,227,852 A * | 1/1966 | Fullerton et al. | ...... 219/137.31 |
| 3,305,664 A | 2/1967 | Kensrue | |
| D207,977 S | 6/1967 | Kensrue | |
| 3,488,468 A | 1/1970 | Carbone | |
| 3,744,694 A | 7/1973 | Karnes et al. | |
| 4,131,783 A | 12/1978 | Kensrue et al. | |
| 4,845,336 A | 7/1989 | Samokovliiski et al. | |
| 4,954,690 A | 9/1990 | Kensrue | |
| 5,488,217 A | 1/1996 | Ni | |
| 5,595,671 A | 1/1997 | David | |
| 5,728,995 A | 3/1998 | Kensrue | |
| 6,064,036 A * | 5/2000 | Kensrue | ................... 219/137.2 |
| RE36,997 E | 12/2000 | Kensrue | |
| 6,225,599 B1 | 5/2001 | Altekruse | |
| 6,271,497 B1 | 8/2001 | Zapletal | |
| 6,568,578 B1 * | 5/2003 | Kensrue | .................... 226/176 |

OTHER PUBLICATIONS

Figure 1 is an assembly drawing of a welding gun that was on sale before Dec. 19, 2001.
Figure 2 is an assembly drawing of a welding gun that was on sale before Dec. 19, 2001.
Figure 3 is an assembly drawing of the Cobra™ welding gun, which was discussed in the Summary of the Invention and was on sale before Dec. 19, 2001.

* cited by examiner

*Primary Examiner*—Len Tran
(74) *Attorney, Agent, or Firm*—Knobbe, Martens, Olson & Bear, LLP

(57) ABSTRACT

A welding gun includes a motor, a wire feed mechanism, a power block, a welding tip, a and a cup. A substantially rigid shell surrounds the motor to form a handle. A gas passage for receiving inert gas from an inert gas source and delivering the inert gas to the gas path in the torch barrel extends at least partially within the handle.

24 Claims, 12 Drawing Sheets

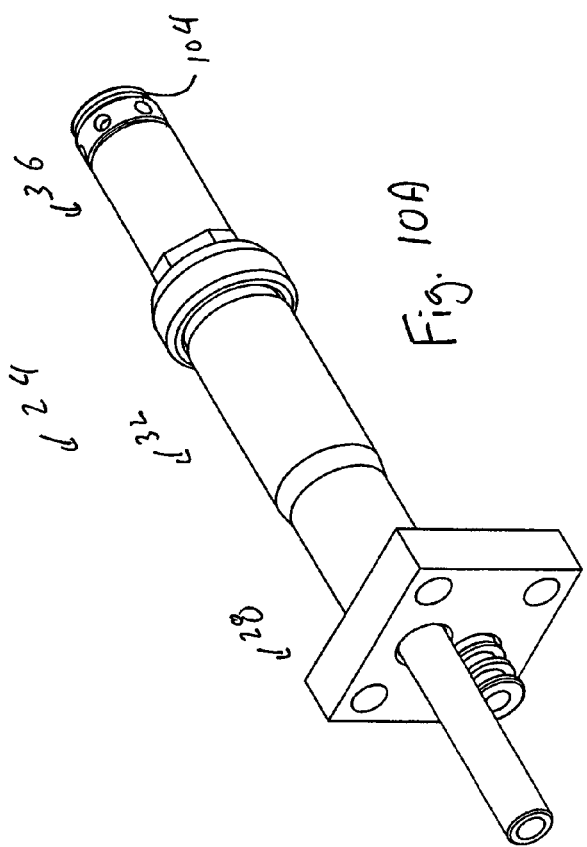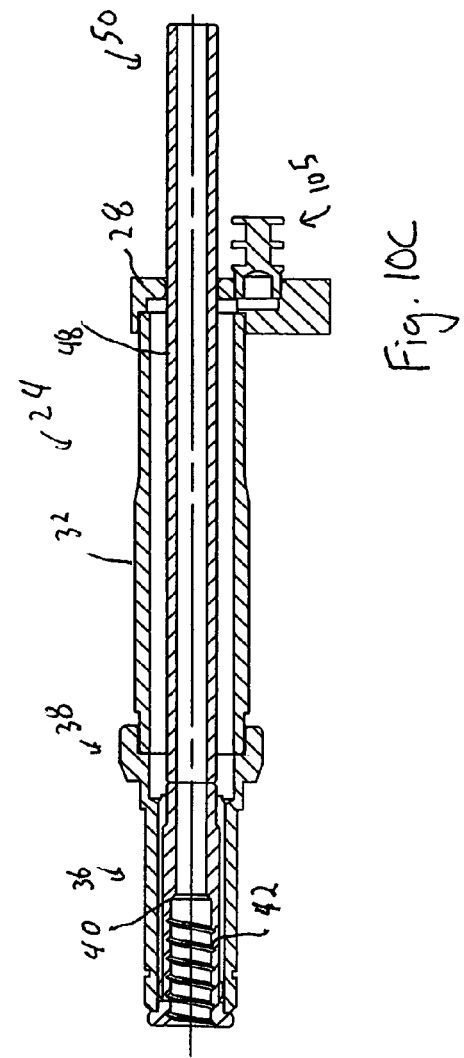
Fig. 10A
Fig. 10B
Fig. 10C

MINIATURE WELDING GUN

PRIORITY INFORMATION

This application claims the priority benefit under 35 U.S.C. § 119(e) of Provisional Application 60/560,025 filed Apr. 5, 2004.

BACKGROUND OF THE INVENTION

1. Field of the Invention

This invention relates to a welding gun and, in particular, to a miniature welding gun.

2. Description of the Related Art

A goose neck metal inert gas (MIG) welding gun generally comprises a handle, a wire feed mechanism, and a torch gun or barrel. The welding gun typically also includes a gas tube for supplying inert gas to the end of the torch barrel. Some welding guns also include a water tube for supplying cooling water to the end of the torch gun or barrel. "Push-pull" MIG welding guns typically also include motor for driving the wire feed mechanism.

There are three general types of welding guns: pistol grip, goose neck and in-line welding guns. In a pistol grip gun, the motor is located below the wire feed mechanism within a handle and lies along an axis that lies generally perpendicular to the longitudinal axis of the gun. In contrast, in an in-line gun, the motor lies along the longitudinal axis of the gun and is positioned generally behind the wire feed mechanism. A goose-necked gun includes a curved torch gun or barrel. In some arrangements, the welding gun is configured such that the operator can change the angular position of a curved barrel relative to the wire feed mechanism.

A MIG welding gun typically also has a contact tip that preferably performs two functions. First, it accurately guides a weld wire to the point of contact with the workpiece. Second, it conducts adequate current, which may be as high as 400 amps or more, to the weld wire. To achieve those results, a relatively long contact tip made of copper can be provided. The contact tip can have an axially extending hole provided therethrough. The hole preferably is sized slightly larger than the diameter of the weld wire. Typically, the outer diameter of the weld wire is about 0.004 inches to about 0.020 inches less than the diameter of the hole. In one common embodiment, the weld wire outer diameter is between 0.008 inches and 0.012 inches less than the inner diameter The contact tip can be coupled to and extend from a gas diffuser, which is in communication with the gas tube. In this manner, an inert gas can be directed around the welding arc through the gas diffuser. Current can be supplied from a power block and then through the torch barrel and to the contact tip.

In general, welding guns are used by professional welders in many industrial applications. To meet the demands of these industrial applications, welding guns are typically relatively heavy and bulky instruments. Nevertheless, there is a general need for a smaller, lighter welding gun that can be used in non-industrial applications. For example, such a smaller, lighter welding gun may find utility in emergency, hobby, home or recreational environments. It would also be advantageous for such a smaller, lighter welding gun to also be a "push-pull" welding gun because of its generally superior performance, especially when welding with aluminum wire. Despite this need, efforts to date to develop a smaller, lighter welding gun for emergency, hobby, home and/or recreational uses have not been satisfactory.

SUMMARY OF THE INVENTION

Accordingly, one embodiment of the present invention comprises a welding gun including a gas cap and a wire feed mechanism that defines at least a portion of a wire feed path. A contact tip defines a bore that is configured to receive wire from the wire feed mechanism. A power block is electrically coupled to the contact tip. A motor is positioned below the at least portion of the wire feed path. A substantially rigid shell surrounds the motor to form a handle. The shell also, at least partially, surrounds the wire feed mechanism and the power block. A gas passage is configured for receiving inert gas from an inert gas source and delivering the inert gas to gas cap. The gas passage extends at least partially through the handle.

Another embodiment of the invention comprises a welding gun including a gas cap and a wire feed mechanism that defines at least a portion of a wire feed path. A contact tip defines a bore that is configured to receive wire from the wire feed mechanism. A power block is electrically coupled to the contact tip. A motor is positioned below the at least portion of the wire feed path. A substantially rigid shell surrounds the motor to form a handle. The shell also, at least partially, surrounds the wire feed mechanism and the power block. A gas passage is for receiving inert gas from an inert gas source and delivering the inert gas to gas cap. The gas passage has a first portion that extends upwardly along the handle and second portion that extends substantially along the at least portion of the wire feed path.

Another embodiment of the invention comprises a welding gun including a gas cap and a wire feed mechanism that defines at least a portion of a wire feed path. A contact tip defines a bore that is configured to receive wire from the wire feed mechanism. A power block is electrically coupled to the contact tip. A motor is positioned below the at least portion of the wire feed path. A substantially rigid shell surrounds the motor to form a handle. The shell also, at least partially, surrounds the wire feed mechanism and the power block. A gas passage is configured for receiving inert gas from an inert gas source and delivering the inert gas to gas cap. The gas passage has a first portion that extends along the handle and second portion that extends substantially along the wire feed path and wherein between the first portion and the second portion the gas passage is located entirely within the shell.

BRIEF DESCRIPTION OF THE DRAWINGS

FIG. 10A is a side perspective view of the welding torch of FIG. 5;

FIG. 10B is a rear view of the welding torch of FIG. 10A; and

FIG. 10C is a cross-sectional view taken along lines 10C—10C of FIG. 10B.

DETAILED DESCRIPTION OF THE PREFERRED EMBODIMENT

Figure 1:
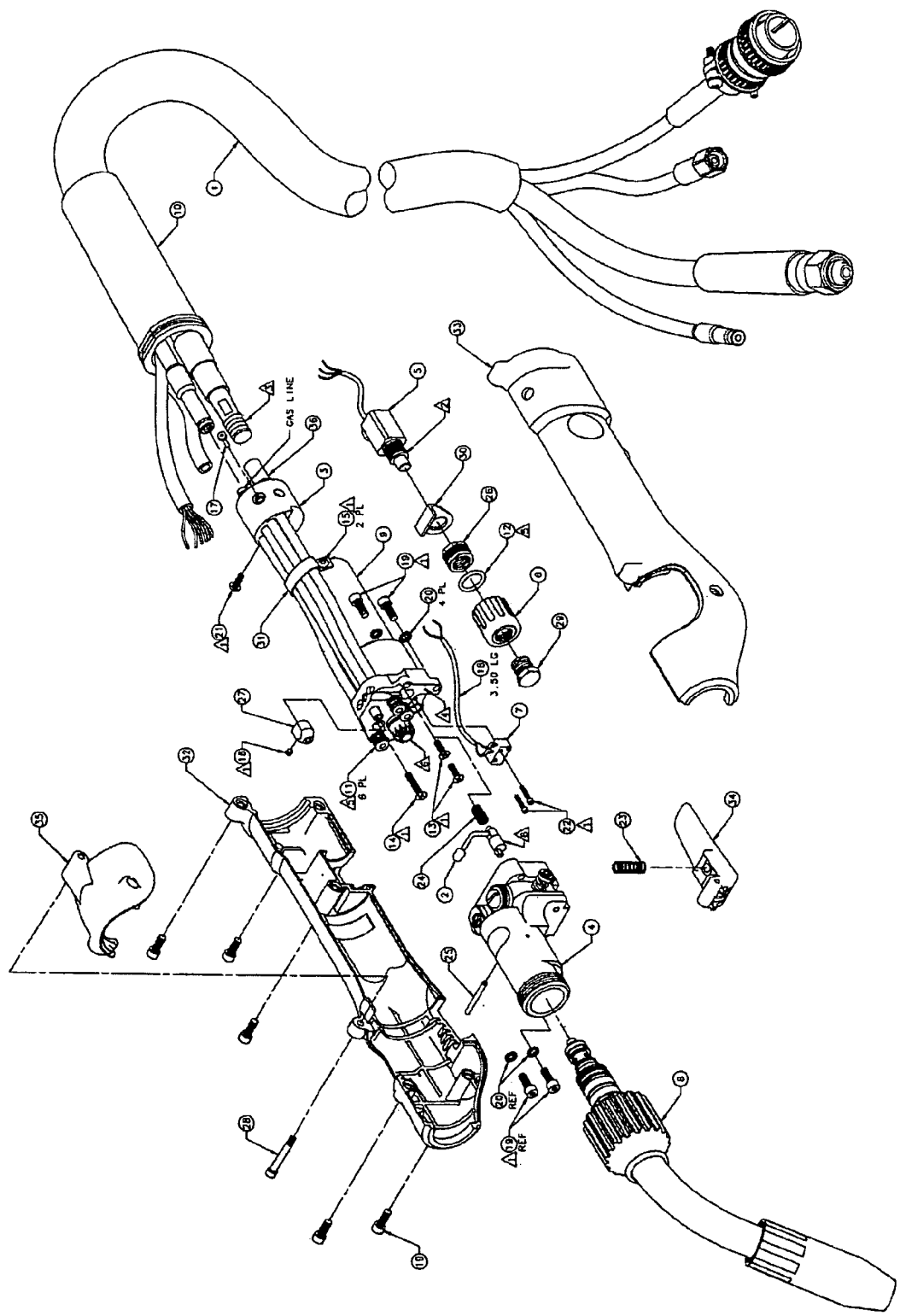
FIG. 1 is a perspective view of a welding gun having certain features and advantages according to the present invention.
Figure 2:
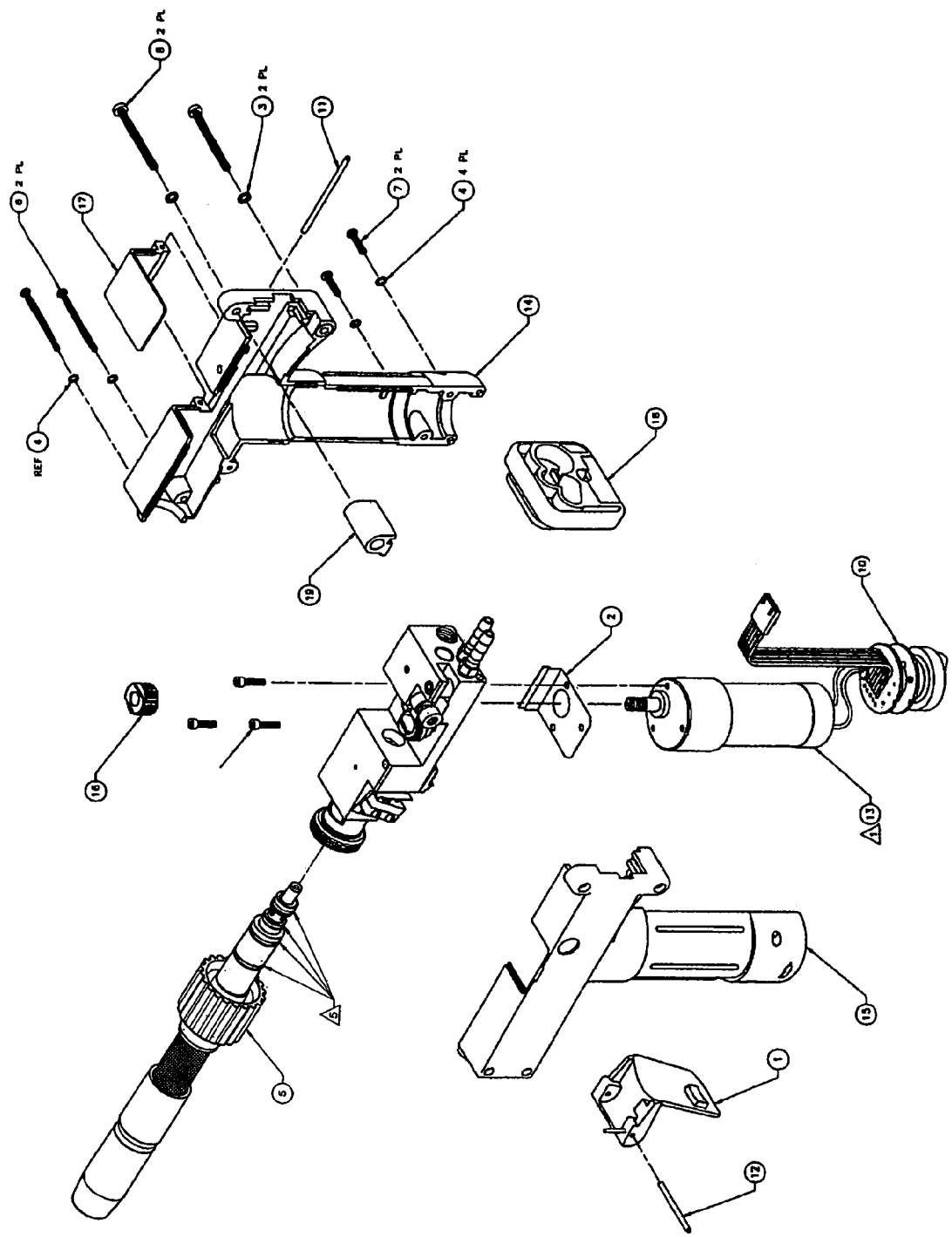
FIG. 2 is a side elevational view of the welding gun of FIG. 1.
Figure 3:
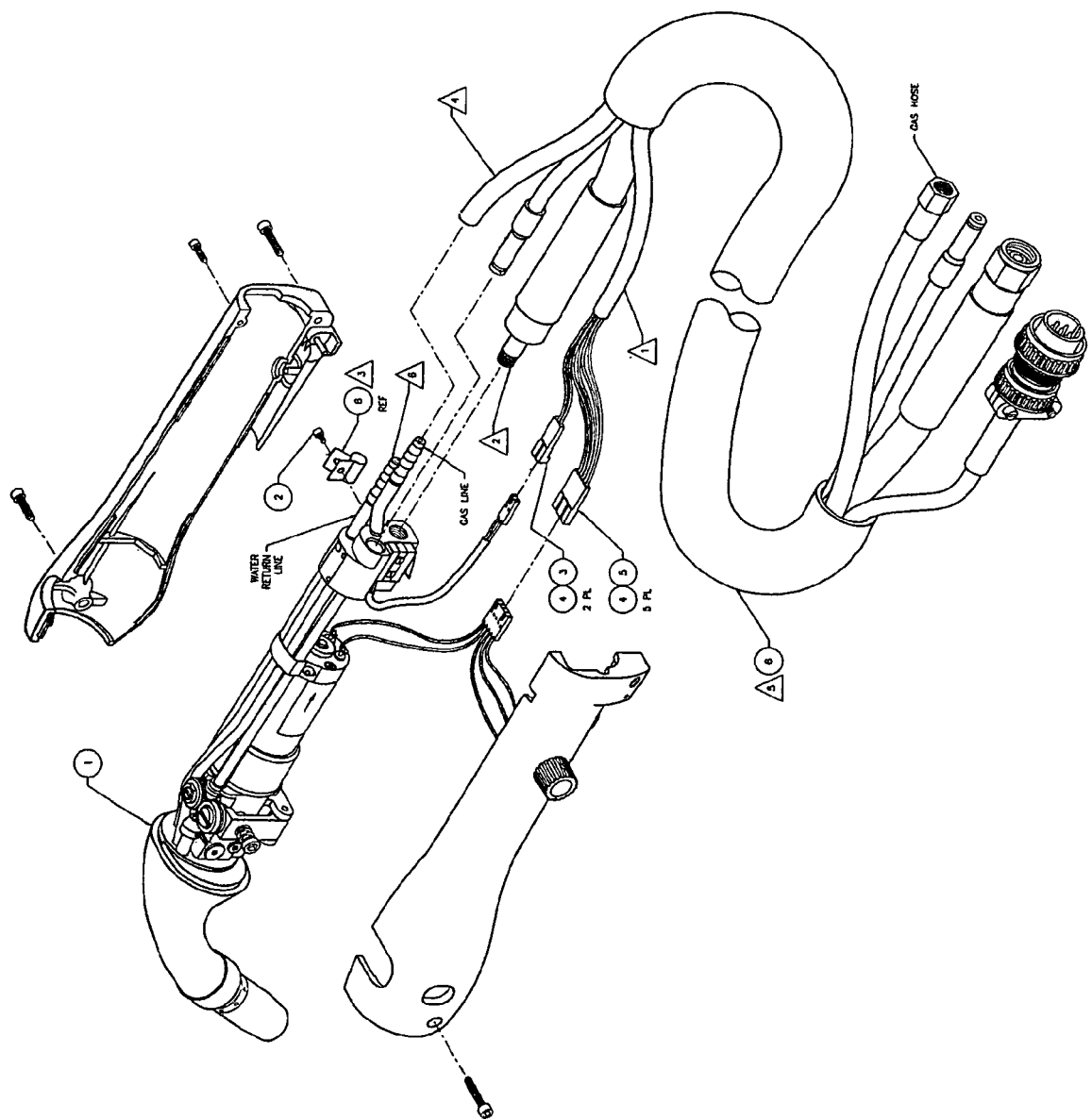
FIG. 3 is a cross-sectional view of the welding gun of FIG. 1

FIGS. 1 and 2 are a perspective and side views of an exemplary embodiment of a welding gun 10. In the illustrated embodiment, the gun 10 includes a handle 12, a torch barrel section 14 and a welding tip 16. FIG. 3 is a cross-sectional view of the gun 10 that illustrates a motor 18, which is positioned inside the handle 12. The longitudinal axis 11 of the handle 12 and the motor 18 preferably lie transverse to the longitudinal axis 12 of the gun 10 and, more preferably, substantially perpendicular to the axis 12 of the gun 10. The illustrated gun 10, therefore, is a "pistol grip" welding gun. The motor 18 and other portions of the gun are preferably covered by a substantially rigid, two-piece molded plastic casing 20a, 20b, which is best seen in FIG. 4 and will be described in more detail below.

Figure 4:
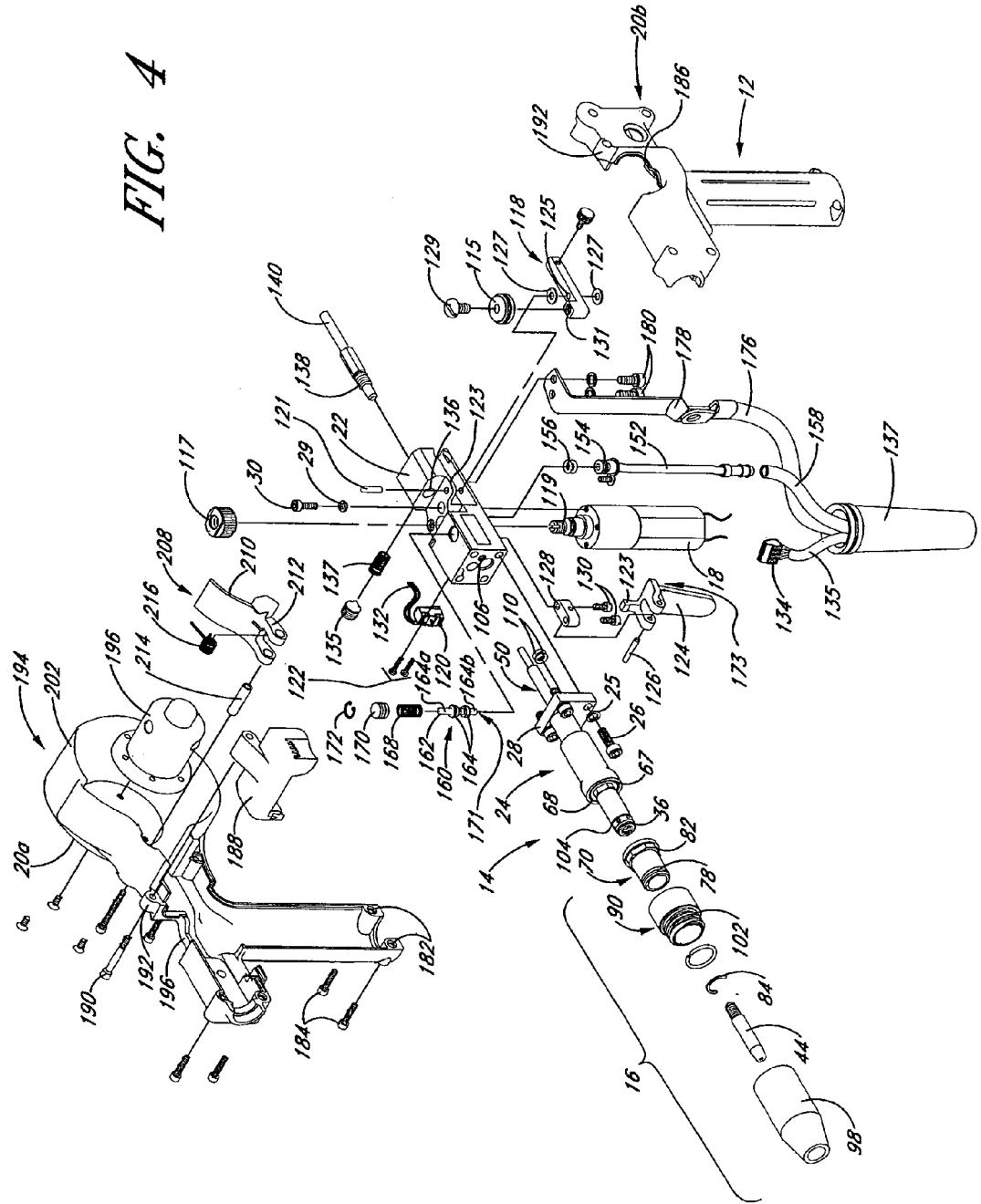
FIG. 4 is an exploded perspective view of the welding gun of FIG. 1.

With particular reference to FIGS. 3 and 4, the gun 10 includes a power block 22, which is preferably made of aluminum. In the illustrated embodiment, the power block is generally in the form of a rectangle preferably at least two flat sides 23a, 23b generally perpendicular to each other with the first side 23a perpendicular to the longitudinal axis 12 of the gun and the second side 23b perpendicular to the longitudinal axis 11 of the handle 12. It should be appreciated that the power block 22 need not have a block, rectangular or square type shape with one or more flat sides.

A torch barrel assembly 24 (see also FIG. 5) is removably attached to the first side 23a of the power block 22 by washers 25 and bolts 26, which extend through a barrel mount 28 and into the power block 22. In a similar manner, the motor 18 is removably attached to the second side 23a of the power block 22 by washers 29 and bolts 30. The plastic casing 20a, 20b, encloses the power block 22, the barrel 24 and the motor 18 when these components are assembled together. Modified embodiments may include a speed control mechanism, for controlling the speed of the motor. In such embodiments, the speed control mechanism may be attached to the proximal end of the motor 18 and enclosed within the casing 20a, 20b.

The barrel assembly 24 will now be described in more detail with reference to FIGS. 4, 5, 9 and 10A–C. The barrel assembly 24 extends generally along the longitudinal axis of the gun 10. The barrel assembly 24 preferably includes the barrel mount 28 and a tubular member 32, which extends from the barrel mount 28 and defines, at least in part, a barrel cavity 34. The distal end of the barrel assembly includes gas nozzle 36. The gas nozzle 36 includes a proximal fitting 38 for receiving a distal end of the tubular member 32. A tip attachment 40 is fitted within the distal end of the gas nozzle 36. The tip attachment 40 includes internal threads 42 such that a wire or contact tip 44 (see FIG. 4) with corresponding outer threads 46 can be attached to the tip attachment 40.

Figure 5:
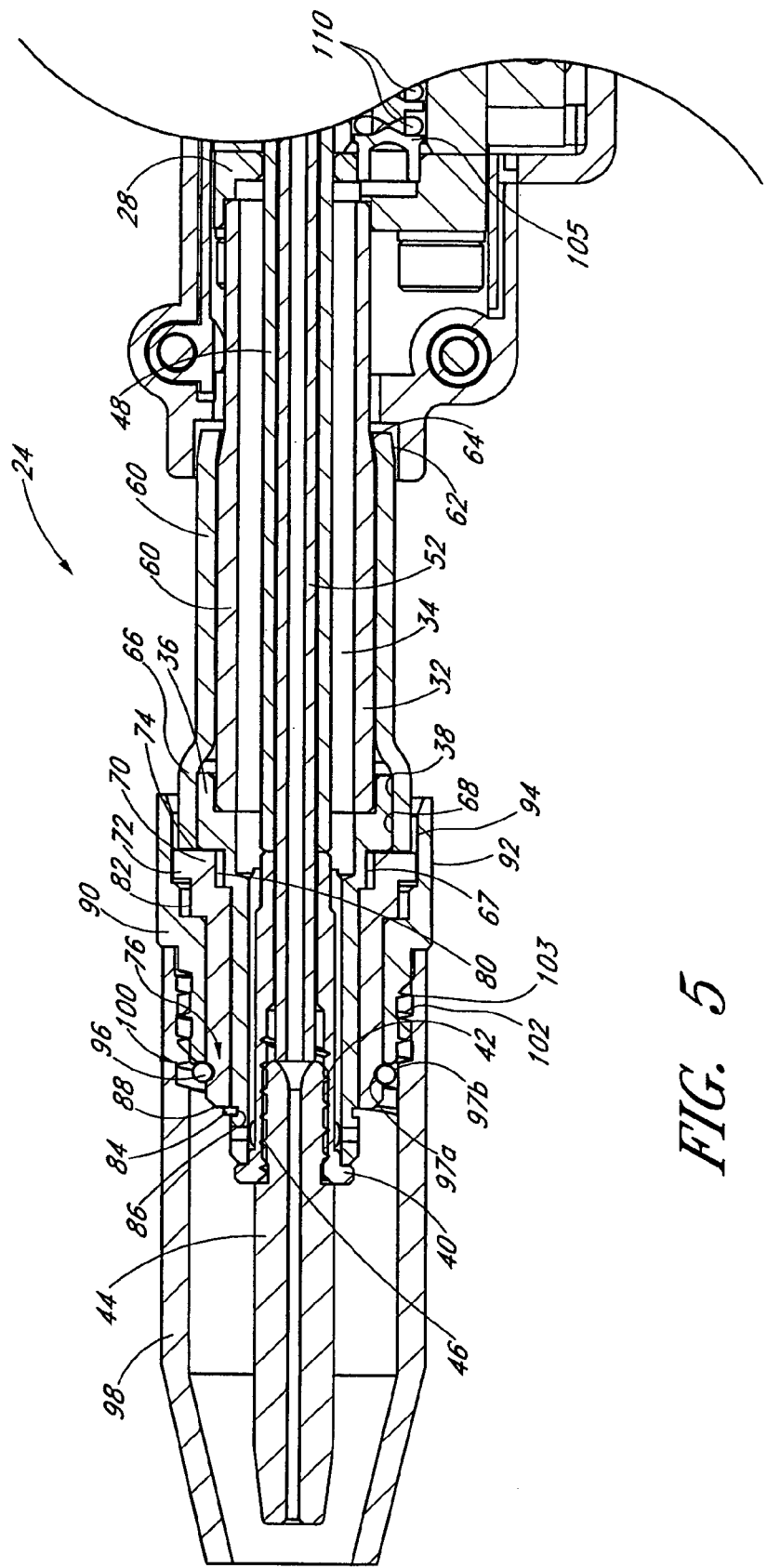
FIG. 5 is a cross-sectional view of a welding torch and welding tip of the welding gun of FIG. 1.

With particular reference to FIG. 5, the barrel assembly 24 preferably includes a wire tube 48 that extends from the barrel mount 28 within the tubular member 32. In the illustrated embodiment, the tip attachment 40 is secured (e.g. brazed or soldered) to the distal end of the wire tube 48 within the gas nozzle 36. An inlet 50 of the wire tube 48 extends through the barrel mount 28. (See FIGS. 4 and 10C). An inner tube 52 preferably extends through the wire tube 48 and into the tip attachment 40 such that it abuts against the wire tip 44. The inner tube 52 may be lined with a smooth material (e.g., Teflon™) to reduce friction.

As shown in FIG. 5, an outer tubular member 60 is positioned around the tubular member 32. The outer tubular member 60 includes a proximal end 62, which is crimped down to mate with a narrowing portion 64 of the tubular member 32. The distal end 66 of the outer tubular member 60 is flared to define a recessed area 68 between the outer tubular member 60 and the tubular member 32. The proximal fitting 38 of the gas nozzle 36 fits within the recess 68 and receives the distal end of the tubular member 32. As best seen in FIG. 4, the outer surface of the gas nozzle 36 preferably forms an anti-rotational member 67 (e.g., hexagonal protrusion) adjacent the proximal fitting 38.

With reference to FIGS. 4 and 5, an inner sleeve 70 includes a proximal end 72 with a proximal flange 74 and a distal end 76 with a locking groove 78 on its outer surface. The proximal flange 74 defines a recess 80 (see FIG. 5) that is configured to engage the anti-rotational member 67 of the gas nozzle 36. The flange 74 also includes an anti-rotational member 82 (e.g., a hexagonal protrusion) on its outer surface. The inner sleeve 70 is secured axially on the gas nozzle 36 by a locking clip or C-ring 84 which engages a groove 86 formed on the outer surface of the gas nozzle 36 and contacts a distal edge 88 of the inner sleeve 70.

An outer sleeve 90 is positioned over the inner sleeve 70. The outer sleeve 90 includes a proximal end 92 which forms a recess 94 configured to engage the anti-rotational member 82 of the inner sleeve 70 and that extends over the junction between the inner sleeve 70 and the outer tubular member 60. The outer sleeve 90 is secured axially on the inner sleeve 70 by a locking clip 96 positioned with corresponding grooves 97a, 97b on the inner sleeve 70 and the outer sleeve 90. The distal end 100 of the outer sleeve also includes outer threads 102 for engaging inner threads 103 of a cup 98 (see also FIG. 4).

With continued reference to FIG. 5, the space 34 between the wire tube 48 and the tubular member 32 forms a gas path. The gas path terminates at the gas nozzle 36. As best seen in FIG. 4, the gas nozzle 36 includes a set of openings 104 through which gas can be discharged to shield the tip of the wire (not shown) when the work piece is being welded. The gas nozzle 36, tip attachment 40, wire tip 40, inner sleeve 70, outer sleeve 90 and cup 98 together define the welding tip 16 in the illustrated arrangement. As seen in FIG. 5, the gas path 34 is in communication with a connector 105. The connector 105 preferably includes a sealing member 110 (e.g., an O-ring) to minimize or prevent leaks. See also FIGS. 4, 9 and 10C). The connector 105 fits within an opening 106 (FIG. 4) preferably provided in the front side 23a of the power block 22.

Junctions and interfaces between various components of the barrel assembly 24 (e.g., the wire tube, 48, tip attachment 40, tubular member 32, outer tubular member 60, inner tube 52, etc.) may be brazed or soldered together. For example, in one embodiment, the tip attachment 40 is silver soldered into the gas nozzle 36 and the tubular member 32 and the tube 52 is brazed into the tip attachment 40.

Figure 5B:
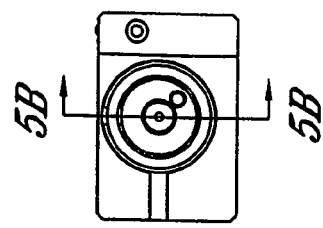
FIG. 5B is a front view of the welding torch of FIG. 5A.
Figure 5A:
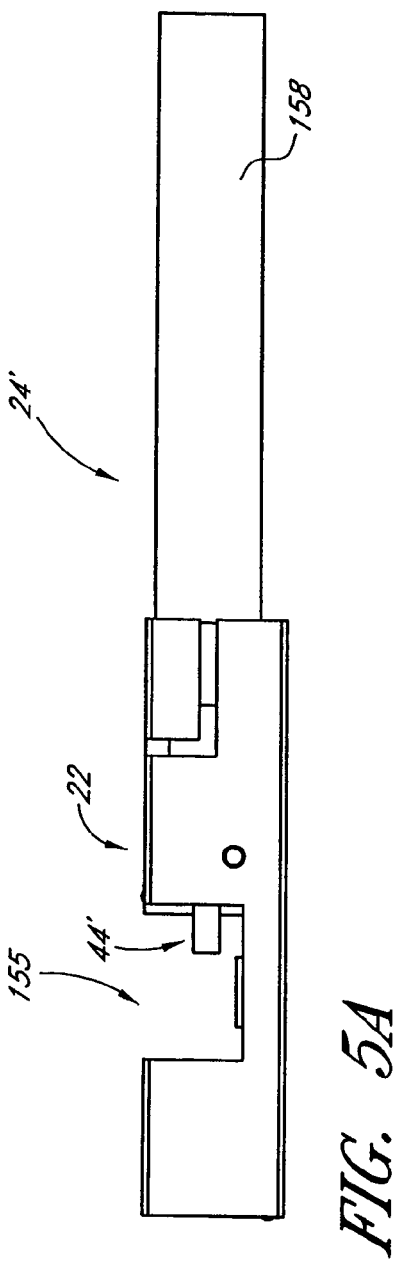
FIG. 5A is a side view of a modified embodiment of a welding torch.
Figure 5C:
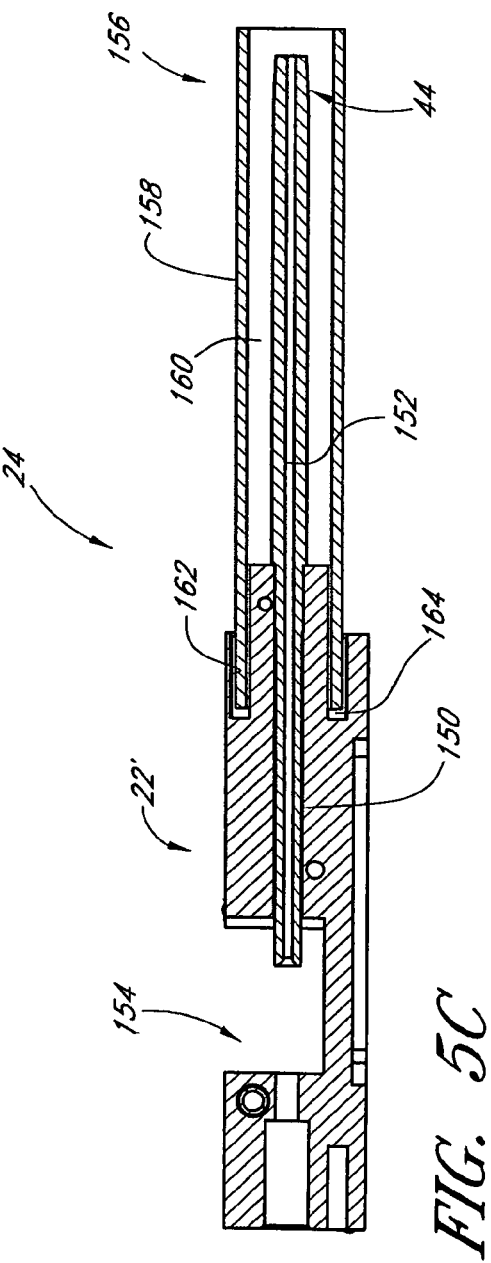
FIG. 5C is a cross-sectional view taken along line 5C—5C of FIG. 5A.

Those of skill in the art will recognize that there are several different manners in which the components of the barrel assembly 24 may be modified, replaced or combined while still providing a path for inert cooling gas, a guide for the weld wire and/or an arrangement for conducting adequate current to the weld wire. For example, FIGS. 5A–C illustrates one particularly advantageous modified embodiment of a barrel assembly 24'. In this embodiment, the torch assembly 24' includes an elongated contact tip 44', which extends directly into a bore 150 formed in the power block or power block 22'. In this manner, the contact tip 44' provides a wire path 152 that extends from a recess 144 in the block 22' to the end 156 of the torch barrel 24'. As will be explained in more detail below, a wire feeding mechanism may be positioned, at least partially, in the recess 144.

With continued reference to FIGS. 5A–C, in this embodiment, a gas cup 158 comprises an elongated tubular member 158 that defines a gas path 160 that generally surrounds the contact tip 44'. A proximal end 162 of the gas cup 158 is coupled to the power block 22'. In the illustrated embodiment, the gas cup 158 is coupled to the bock 22' by providing an annual recess 164 in the block for receiving the proximal end 162 of the cup 158. The gas cup 158 and the contact 44' may secured to the block 22' by brazing, bolts, interengaging threads etc. As will be explained in more detail below, the gas path 160 may be placed in communication with an inert gas source through one or more passages formed din the power block 22.

Figure 5D:
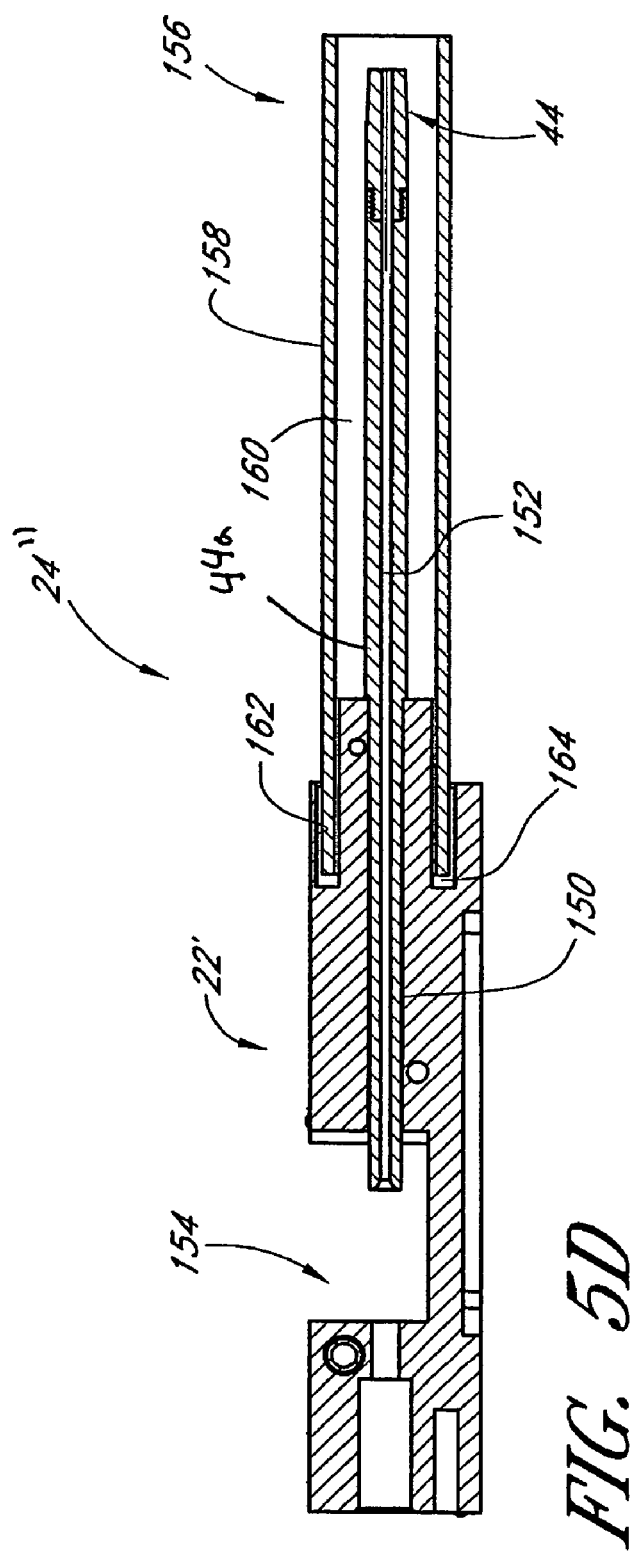
FIG. 5D is a cross-sectional side view of another embodiment of a welding torch.

FIG. 5D illustrates another embodiment in which the contact tip 44" is divided into a proximal member 44a', which is coupled to the power block 22', and a distal member 44b' which is preferably removably attached to the proximal member 44a'. In the illustrated embodiment, the distal member 44b' is attached to the proximal member 44a' by providing interengaging threads between the two components. In this manner, the distal member 44b' may be removed and replaced as needed.

With reference now to FIGS. 4 and 6A–D, the power block 22 includes a cut away section 112 to provide a recess in which is seated a wire feed mechanism 114 (see FIG. 3) known in the art, which in the illustrated embodiment comprises an idler roller 115 (see FIG. 4) and a drive roller 117, which form a wire path therebetween. The motor 18 includes a drive shaft 119, which extends into the power block 22. The driver roller 117 is driven by the drive shaft 119. The idler roller 115 is mounted on a hinge like member 118 that pivots so that the idler roller 115 can be moved towards or away from the drive roller 117. In the illustrated embodiment, the member 118 may be positioned in a groove 119 (see FIG. 6A) formed in the power block 22 and a pivot shaft 121 extends through a bore 123 in the power block 22 and a bore 125 in the member 118. Washers 127 may be provided on the pivot shaft 121. The idler roller 115 may be attached to the member 118 by a screw 129 that extends into a threaded hole 131 provided at a distal end of the member 118. In this manner, as the proximal end of the member 118 is pivoted away or towards the power block 22 the idler roller 115 is moved towards or away from the drive roller 117. An idler tension adjustment mechanism comprising a nut 135 and a spring 137 may be positioned within a bore 133 (see FIG. 6A) formed in the power block 22 to contact the proximal end of the member 118 and adjust the spacing between the idler and driver rollers 115, 117.

As illustrated in FIG. 4, a micro switch 120 is removably positioned within a recess 121 (see FIG. 6C) of the power block 22 by bolts 122. The micro switch 120 is activated by an actuating arm 123 positioned on a trigger 124, which is pivotably supported by a pin 126 that extends through a holder 128. The holder 128 is in turn, secured to the under side of the power block by bolts 130. The micro switch 120 is connected by a cable 132 to a electrical connector 134, which is, in turn, connected to the motor 18. In this manner, movement of the trigger 124 controls the motor 22 and operation of the welding gun 10. The electrical connector 134 is also attached to a control cable 135, which may extend through a protective boot 137 that extends below the handle 12.

Figure 6B:
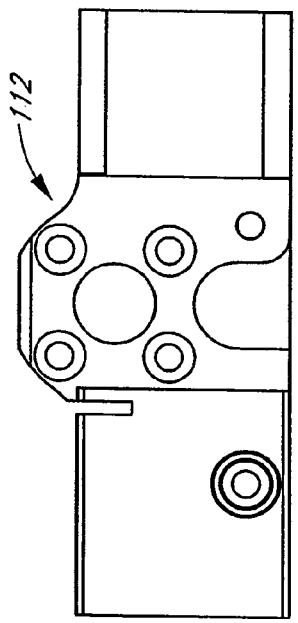
FIG. 6B is a top view of the power block of FIG. 6A.
Figure 6A:
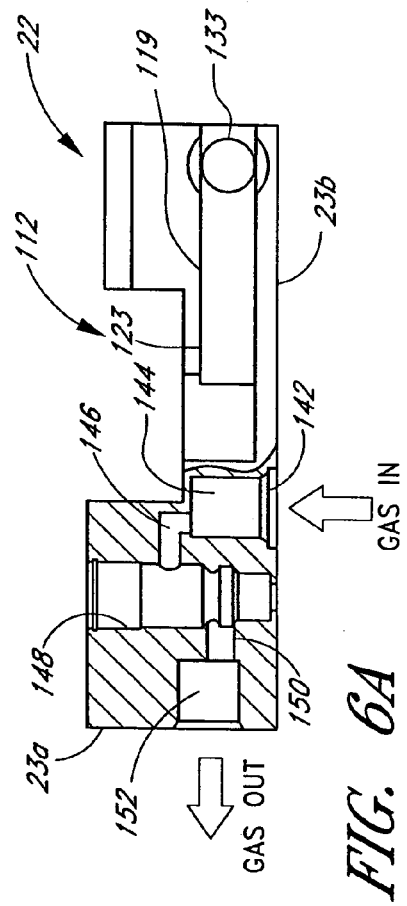
FIG. 6A is a partial cross-sectional side view of a power block of the welding gun of FIG. 1.
Figure 6D:
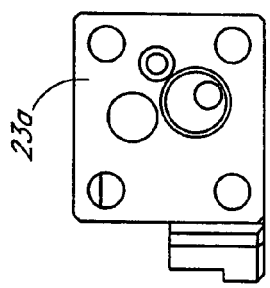
FIG. 6D is a front view of the power block of FIG. 6A.
Figure 6C:
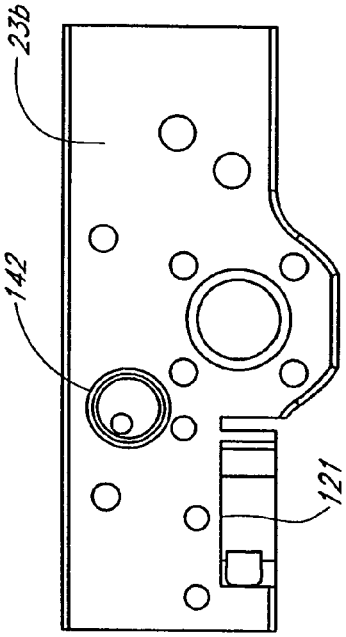
FIG. 6C is a bottom view of the power block of FIG. 6A.

As shown in FIG. 4, the power block 22 includes a first bore 136, which extends through the rear of the power block 22. A welding wire guide 138 is fitted into the bore and may include an inlet liner 140. The welding wire guide 138 guides the wire through the power block and into the wire feeding mechanism 114 between the idler and driver rollers 115, 117. With reference to FIG. 6C, the bottom of the power block 22 includes a gas bore 142. As seen in FIG. 6A, the gas bore 142 forms part of a gas passage 144 formed in the power block 22 to direct gas through the power block 22 and to the torch barrel 114. In the illustrated arrangement, the gas bore 142 extends generally upwardly and is connected to a sub-passage 146 that transitions the gas passage 144 from a generally upwardly direction to a generally longitudinal direction. The sub-passage 146 is connected to a transverse bore 148. A second sub-passage 150 extends from the transverse bore 148 in the longitudinal direction and is connected to a gas outlet bore 152. The gas outlet bore 152 forms the opening 106 which receives the connector 105 such that gas may be supplied to the torch barrel 14.

With reference to FIG. 4, a gas line 152 includes a fitting 154 that is configured to be inserted in to the gas bore 142. A sealing member 156 (e.g., an O-ring) is preferably provided between the fitting 154 and the bore 142. The gas line 152, in turn, is connected at its proximal end to a gas hose 158, which may extend through the boot 137. The gas hose 158 may be connected to a gas source as is known in the art. In this manner, gas may be supplied to the gas passages 144 formed in the power block 22.

With continued reference to FIG. 4, a valve 160 is preferably moveably positioned in the transverse bore 148. The valve 160 of the illustrated arrangement is a trumpet valve comprising a longitudinal stem 162 and two enlarged, sealing portions 164, 164 axially displaced along the stem 162. The sealing portions 164*a,b* are preferably configured to receive sealing members 166 (e.g., O-rings). The valve 160 is biased into a first position by a spring 168. The spring 168 is supported between the upper sealing portion and a stop 170. The stop 170, in turn, is secured in the transverse bore by a locking ring 172 which engages grooves 174 formed on the stop 170 and the transverse bore 148. When positioned in the bore 148, a distal end 171 of the valve 160 extends out of the power block 22 and contacts an extension 173 on the trigger 124. In this manner, the trigger 124 is biased to a first position in which the trigger 124 is displaced form the handle 12. In this first position, the lower sealing portion 164*b* seals the bottom of the bore 148 while the upper sealing portion 164*a* prevents gas from the sub passage 146 from entering the outlet bore 152. As the trigger 124 is compressed and moved towards the handle 112, the spring 168 is compressed and the upper sealing portions 164*a* moves upwardly to allow gas to flow from the sub passage 146 to the outlet bore 152. In this manner, the trigger 124 controls both the motor 18 and the flow of gas through the gun 10. In modified embodiments, the gun 10 may be formed without the valve 160 and a valve may be provided in upstream of the gun 10 (e.g., in a control cabinet).

A power cable 176 extends through the boot 137 is electrically connected to the power block 22. In the illustrated embodiment, the power cable 176 is connected to a bracket 178, which extends along side the motor 118 within the handle 12. The bracket 178 is secured to the power block 22 by bolts 180. Accordingly, current can flow from the cable along the power block 22 through the wire tube 48 to the wire tip attachment 40. An arc forms between the tip of the wire and the work piece. Thus, the current flows to the welding wire as it exits the welding tip 16.

With continued reference to FIG. 4, the casing 20a,b is preferably molded of a suitable plastic material which serves as both an electrical and heat insulator. As mentioned above, the casing 20a,b is preferably divided into two sections 20a and 20b. A series of mounting sites 182 along their edges, which allows the casing to be screwed together by screws 184 that are received in the mounting sites 182. The sections 20a,b fit preferably snugly around and cover the power block 22, motor 18 and the proximal end of the barrel section 14.

This casing 20 has a first opening 186 defined by the two pieces 20a, 20b to provide access to the drive and idler rollers 115, 117. A lid 188 preferably covers the opening 114 and is attached to the casing by a pivot shaft 190 extending between mounts 192a, 192b formed on the two pieces 20a, 20b.

With continued reference to FIGS. 3 and 4, the first piece 20a of the casing 20 has a rear section 194 that extends rearwardly from the power block 22. In the illustrated arrangement, this rear section 194 forms a cover and a support for a spindle 196, which supports a wire spool 198 (see FIG. 7) as will be described in more detail below. The wire rear section 194 generally comprises a side panel 200 to which the spindle 196 may be attached. A generally cylindrical side wall 202 extends around the periphery of the side panel 200 to define a recess 204 in which the spindle 196 and wire spool 198 are positioned. In the illustrated arrangement, the recess 204 is open; however, in modified embodiments, a cover (not shown) may be removably attached to the casing 20 to close the recess 20. The side wall 202 preferably includes as enlarged diameter portion 206, which defines a space for receiving a wire restrainer 208. The wire restrainer 208 comprises a S-shaped member 210 and a hinge 212. A pivot shaft 214 is supported by the casing 20 and extends through the hinge 212 such that the restrainer 208 is pivotably supported. A torsional spring 216 is positioned on the shaft 214 to bias the S-shaped member 210 towards the spool 198. As will be explained below, the restrainer 208 prevents the wire from unspooling from the wire spool 198.

The recess 204 is configured to receive a spool preferably having a weight of less than or equal to about 2 pounds, more preferably, less than or equal to about 1 pound, and most preferably, less than or equal to about 0.5 pounds. The shell 20a, 20b, has a longitudinal length preferably less than or equal to about 10 inches and, more preferably, less or equal to 8 inches. The height of the shell is preferably less than or equal to about 8 inches and, more preferably, less or equal to about 7 inches. The width of the shell is preferably less than or equal to about 2 inches. The overall length of the gun 10 is preferably less than or equal to about 14 inches and, more preferably, less or equal to about 12 inches.

The welding gun 10 described above has several advantages, some of which will be highlighted below. For example, in the illustrate arrangement, the gas hose 158 is connected to the welding torch 14 by positioning the gas conduit 152 in the handle 12 with the motor 18. In this manner, a gas passage is defined, at least partially, through the handle 12. More preferably, the conduit 152 is positioned entirely within the handle 12. This arrangement is facilitated by providing an arrangement wherein the gas can flow through passages 144 in the power block 22 into the torch barrel 14 and contact tip. In contrast, some prior art welding guns have a gas line that extends from the boot 137, in front of the handle 12 to the welding torch 14. This arrangement is less advantageous because the gas line may become entangled with the workpiece or related components or tools. In other welding torches, the gas line extends from a connection at the rear of the welding gun behind the power block. This shifts the weight of the boot and the associated cable behind the handle which makes the gun more difficult to maneuver and operate. In other embodiments, the gas passage has a first portion (e.g. a portion defined by the conduit 158) that extends upwardly along the handle 12 and second portion (e.g., a portion defined within the block 22) that extends substantially along the at least portion of the wire feed path defined by the wire feeding mechanism. In other embodiments, the gas passage has a first portion (e.g. a portion defined by the conduit 158) that extends upwardly along the handle 12 and second portion (e.g., a portion defined within the block 22) that extends substantially along at least portion the wire feed path defined by the wire feeding mechanism and between the first portion and the second portion the gas passage is located entirely within the casing 20a, 20b.

The welding gun preferably has a weight less than or equal to about 2 pounds (without the spool) and, more preferably, less than or equal to about 1.5 pounds (without the spool), most preferably, less than or equal to about 20 ounces.

Another advantage of the illustrated embodiment is that the spindle is ergonomically positioned behind the power block and the handle With particular reference to FIG. 3, the axis a of the spindle is position slightly below longitudinal axis l of the welding torch. More preferably, the axis a of the spindle is positioned between about 0.25 inches and about 0.5 inches below longitudinal axis l2 of the welding torch. Most preferably, the axis a of the spindle is positioned about 0.375 inches below longitudinal axis l of the welding torch. In addition, an underside portion 201 of the casing facing the handle 12, defines a space 203 such that when the user grasps the handle 12 and the underside portion 201 of the rests just above the wrist of the user.

Figure 7:
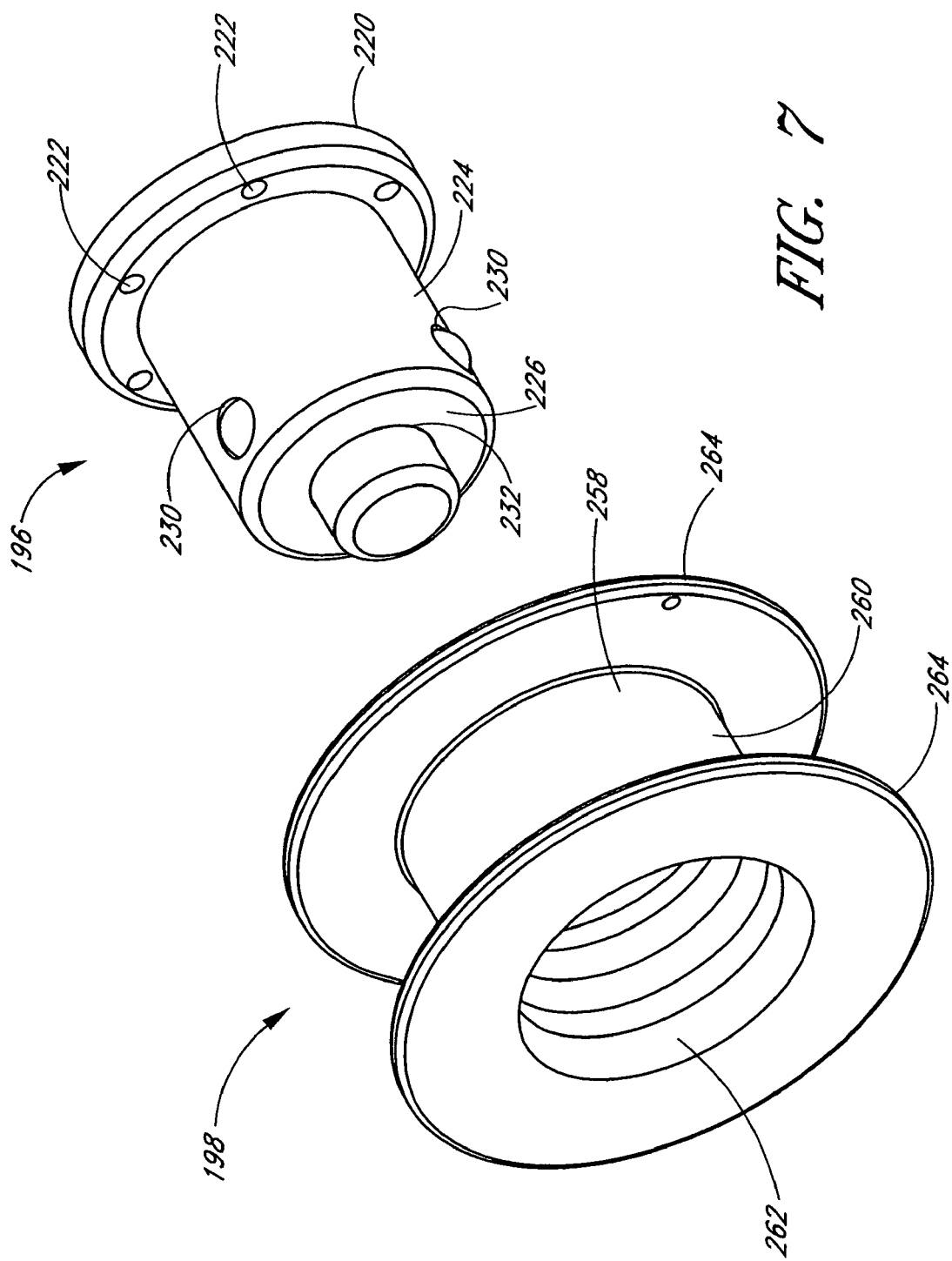
FIG. 7 is a side perspective view of a spindle and wire spool of the welding gun of FIG. 1.
Figure 8:
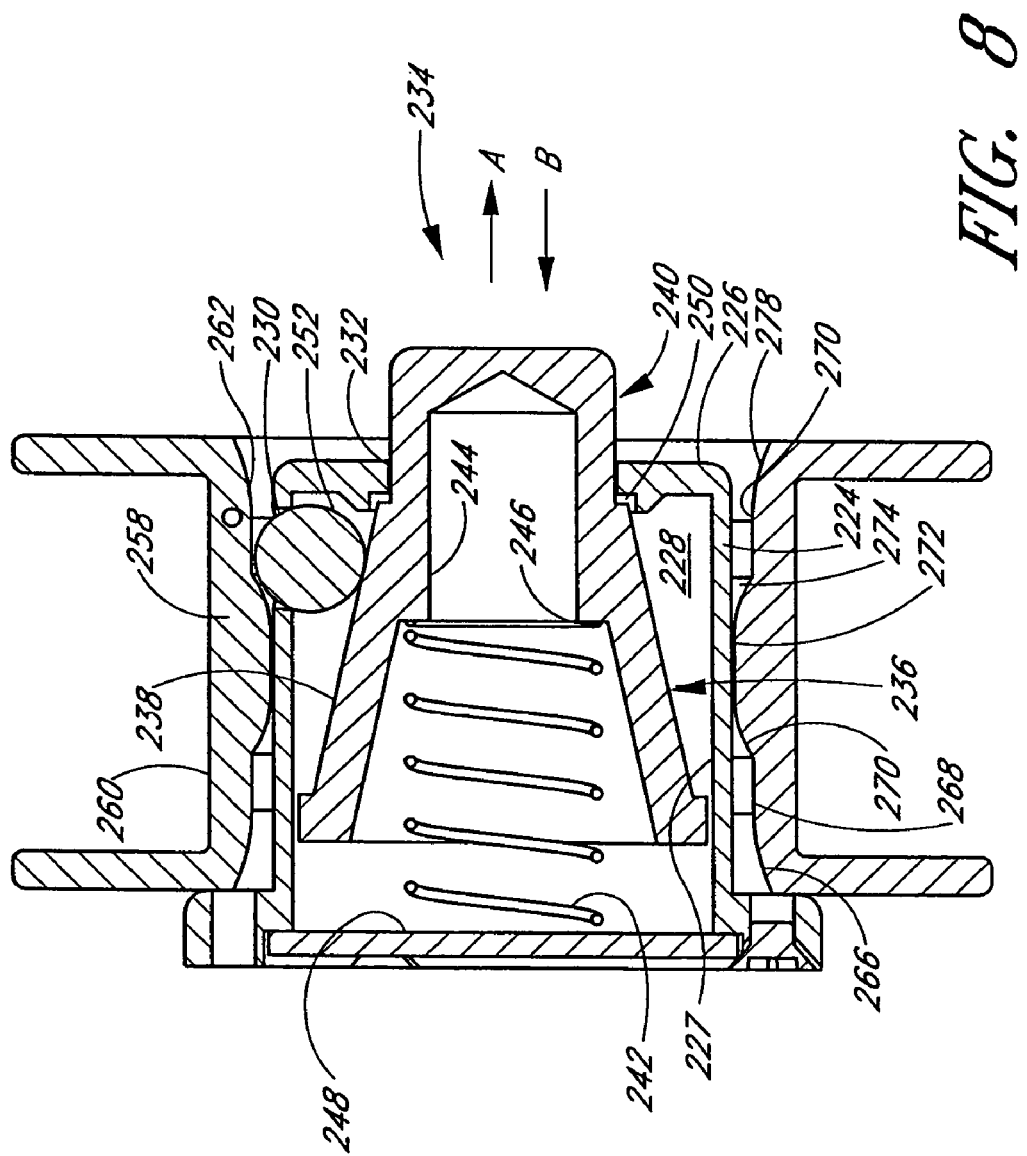
FIG. 8 is a cross-sectional view of the spindle and wire spool of FIG. 7 with the wire spool engaged on the spindle.
Figure 9:
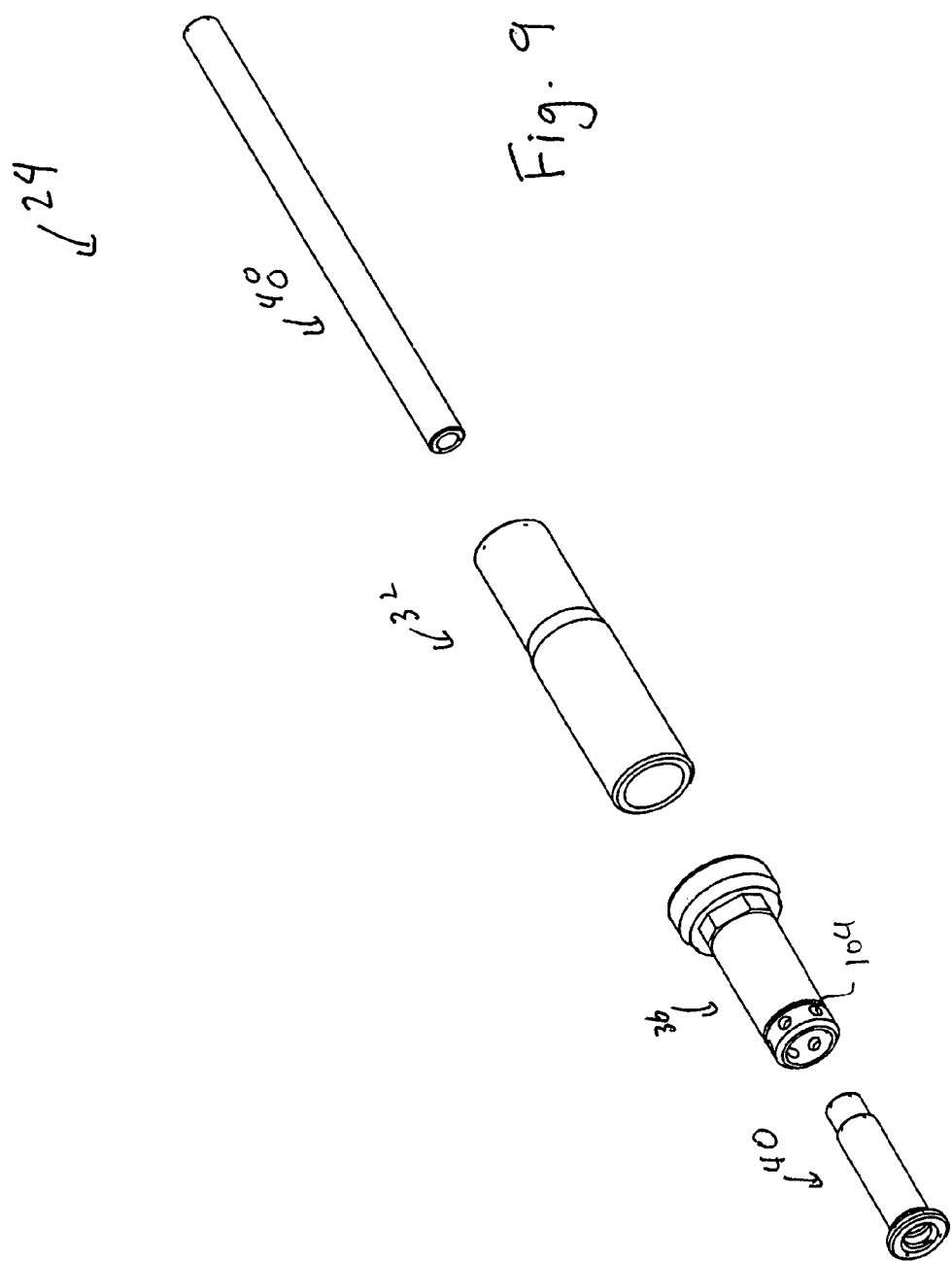
FIG. 9 is an exploded perspective view of the welding torch of FIG. 5.

In the illustrated arrangement, the spindle 196 and the spool 198 are configured such that the spool 198 may be quickly attached and detached to the spindle 196. With reference to FIGS. 7 and 8, the illustrated spindle 196 includes a generally circular base 220 that may include openings 222 for receiving bolts for attaching the spindle to the side wall 200 of the casing 20. A generally cylindrical side wall 224 extends from the base 220 and terminates at a top wall 226. The spindle 196 includes an inner bore 227 that defines a generally cylindrical internal space 228.

The side wall 224 of the spindle includes three circular openings 230, which in the illustrated arrangement are located near the top wall 226. In modified embodiments, more or less openings of different shapes and/or different positions may be used. A generally circular opening 232 is also provided in the top wall 226 to provide access to the internal space 228.

A body or actuating member 234 is positioned partially within the internal space 228 of the spindle 196. The actuating member 234 of the illustrated embodiment includes a lower conical section 236 which defines a generally inclined actuating surface 238. A cylindrical portion 240 extends above the conical section 236 and through the circular opening 232 in the top wall 226. A spring 242 is positioned within a bore 244 formed within the actuating member 234. The spring 242 is positioned between a engagement surface 246 formed within the bore 244 and a end wall 248 coupled to the cylindrical side wall 224. In this manner, the actuating member 234 is biased in the direction of arrow A in FIG. 8. The transition between the cylindrical member 234 and the conical section 236 forms a lip 250. The lip 250 engages the top wall 226 of the spindle 196 such that the actuating member 234 is not forced out of the spindle 196 by the spring 242.

Moveable retainers elements 252 (e.g., balls, pins, etc.) are positioned in the space between the actuating surface 238 and the openings 230. As shown in FIG. 8, when the spring 242 forces the actuating member 236 to its uppermost or first position in the spindle 196, the elements 252 are forced radially outward through the openings 230. As the actuating member 236 is pushed down into the spindle 196 against the force of the spring 242, the space between the actuating surface 238 and the bore 227 increases thereby permitting the elements to move radially inwardly. This decreases the effective outer diameter of the spindle 196 as compared to the first position. In this arrangement, the cylindrical member 234 may be used as a "button" to press down on the actuating member 236.

With continued reference to FIGS. 7 and 8, the spool 198 generally comprises a generally cylindrical main member 258, which defines a circular outer surface 260 for supporting welding wire and a generally circular inner surface 262 having an inner edge 263a and an outer edge 263b. A pair of annual flanges 264 preferably extend from both sides of the outer surface 260 to enclose the wire supported by the outer surface 260.

With particular reference to FIG. 8, from the inner edge 263a the inner surface 262 preferably includes a first portion comprising a conical flared portion 266, a cylindrical portion 268, a preferably rounded or smooth transition portion 270. From the outer edge 263b, there is preferably a second portion comprising a second flared conical portion 278, a third cylindrical portion 276 and a preferably rounded or smooth second transition portion 274. A substantially cylindrical portion 272 preferably lies between the first and second portions. In a preferred embodiment, the shape of the bore 262 is substantially with respect to the inner and outer edges 263a, 263b. As shown in FIG. 8, the second cylindrical portion 272 and the smooth transition portions 270, 274 form an reduced diameter portion or protrusion on the inner bore 262. In the position shown in FIG. 8, the element 262 contacts the transition portion 274 such that the spool 272 is locked onto the spindle. The second cylindrical portion 272 contacts the side wall 224 of the spindle 196 to provide a solid support surface for the spool 198. Advantageously, this support surface is positioned at substantially center of the spool 196 promoting balance and stability. In addition, in the preferred embodiment, the inner bore 262 is symmetrical such that the spool 198 may be reversed on the spindle 196. However, in a modified embodiment, the bore 262 may be unsymmetrical. For example, the first transition portion may have the same diameter as the cylindrical portion 272.

To remove the spool 198 from the spindle 196, the user depresses the actuating member 236 by pressing the cylindrical portion 240. This moves the actuating member 236 in the direction of arrow B. This allows the element 252 to move inwardly and allows the spool 198 to be removed from the spindle 196. The smooth surfaces of the transition surfaces 270, 274 promote movement of the element 252 over the protrusion formed by the second cylindrical surface 272 when the spool 198 is removed. In a similar manner, the flared regions 266, 278 promote movement of the element through the bore 262 as a new spool is inserted onto the spindle 196.

It should be appreciated that in modified embodiments the transition portions 270, 272 may be replaced with annular grooves formed on the inner bore 262. In such an arrangement, the elements 252 engage the grooves in a locked position. While such spools may be used with a quick-release assembly, a spool having a raised support portion is preferred because the tooling required to form a spool with a groove or recess is generally more complex, more expensive and more likely to fail as compared to the tooling required to form a spool with the raised support surface. Specifically, the portions of the tooling or mold configured to form the inner surface must be collapsible for the spool to be disengaged from the mold.

The spool 198, when fully wrapped (i.e., the wire lies slightly below the radial outer edge of the annular flange), it preferably has a weight of less than or equal to about 2 pounds, more preferably, less than or equal to about 1 pound, and most preferably, less than or equal to about 0.5 pounds. The radial outer edge of the annular flange preferably defines a diameter that is less than or equal to about 3 inches, and more preferably, less than or about 2.5 inches.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combination or sub-combinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A welding gun comprising:
a gas cap;
a wire feed mechanism that defines at least a portion of a wire feed path;
a contact tip that defines a bore that is configured to receive wire from the wire feed mechanism;
a power block electrically coupled to the contact tip;

a motor positioned below the at least a portion of the wire feed path;

a substantially rigid shell surrounding the motor to form a handle, the shell also, at least partially, surrounding the wire feed mechanism and the power block;

a spindle for supporting a wire spool, the spindle positioned behind the power block; and a gas passage configured for receiving inert gas from an inert gas source and delivering the inert gas to gas cap, the gas passage extending at least partially through the handle, wherein an axis of the spindle is positioned within about 0.5 to about 0.025 inches below the longitudinal axis of the torch barrel.

2. The welding gun of claim 1, wherein the gas passage is defined in part by a conduit extending along side the motor within the handle.

3. The welding gun of claim 2, wherein the gas passage is defined in part by a passage extending within the power block.

4. The welding gun of claim 3, wherein the conduit is coupled to passage in the power block.

5. The welding gun of claim 1, wherein the gas passage has a first portion that extends upwardly along the handle and second portion that extends substantially along the at least a portion of the wire feed path.

6. The welding gun of claim 5, wherein the first portion of the gas passage extends entirely within the rigid shell.

7. The welding gun of claim 1, wherein the spindle is enclosed, at least partially, by the shell.

8. The welding gun of claim 1, wherein the shell defines a recess for receiving a wire spool.

9. A welding gun comprising:

a gas cap;

a wire feed mechanism that defines at least a portion of a wire feed path;

a contact tip that defines a bore that is configured to receive wire from the wire feed mechanism;

a power block electrically coupled to the contact tip;

a motor positioned below the at least a portion of the wire feed path, said motor defining an axis transverse to said wire feed path;

a substantially rigid shell surrounding the motor to form a handle, the shell also, at least partially, surrounding the wire feed mechanism and the power block;

a gas passage configured for receiving inert gas from an inert gas source and delivering the inert gas to gas cap, the gas passage extending at least partially through the handle; and a spindle for supporting a wire spool;

wherein the spindle is positioned behind the power block, the spindle is enclosed, at least partially, by the shell and the shell defines a recess for receiving the wire spool and wherein the recess is configured to receive a spool having a fully wrapped weight of less than or equal to about 1 pounds.

10. A welding gun comprising:

a gas cap;

a wire feed mechanism that defines at least a portion of a wire feed path;

a contact tip that defines a bore that is configured to receive wire from the wire feed mechanism;

a power block electrically coupled to the contact tip;

a motor positioned below the at least a portion of the wire feed path, said motor defining an axis transverse to said wire feed path;

a substantially rigid shell surrounding the motor to form a handle, the shell also, at least partially, surrounding the wire feed mechanism and the power block;

a gas passage configured for receiving inert gas from an inert gas source and delivering the inert gas to gas cap, the gas passage extending at least partially through the handle; and a spindle for supporting a wire spool;

wherein the spindle is positioned behind the power block, the spindle is enclosed, at least partially, by the shell and the shell defines a recess for receiving the wire spool and the recess is configured to receive a spool having a fully wrapped weight of less than or equal to about 0.5 pounds.

11. The welding gun of claim 7, wherein the spindle is supported by the shell.

12. The welding gun of claim 1, wherein the spool and the spindle are connected by a quick disconnect mechanism.

13. The welding gun of claim 1, wherein the power block includes passages that form part of the inert gas passageway.

14. The welding gun of claim 10, wherein the passages in the power block include an opening formed on a bottom surface of the power block and an outlet formed on the front surface of the power block.

15. The welding gun of claim 14, further including a valve positioned in the passages in the power block.

16. The welding gun of claim 14, wherein the motor is secured to the power block by bolts.

17. The welding gun of claim 1, wherein the axis of the motor is substantially perpendicular to the at least a portion of the wire feed path.

18. The welding gun of claim 1, wherein the wire feed mechanism comprises an idler roller and a feeder roller, the feeder roller being coupled to and driven by the motor.

19. The welding gun of claim 18, wherein the power block supports the idler and drive rollers such that they rotate about axes that extend generally perpendicular to the at least a portion of the wire feed path.

20. The welding gun of claim 9, wherein the gas passage is defined in part by a conduit extending along side the motor within the handle.

21. The welding gun of claim 20, wherein the gas passage is defined in part by a passage extending within the power block.

22. The welding gun of claim 21, wherein the conduit is coupled to passage in the power block.

23. The welding gun of claim 9, wherein the gas passage has a first portion that extends upwardly along the handle and second portion that extends substantially along the at least a portion of the wire feed path.

24. The welding gun of claim 23, wherein the first portion of the gas passage extends entirely within the rigid shell.

* * * * *